Figure 1:
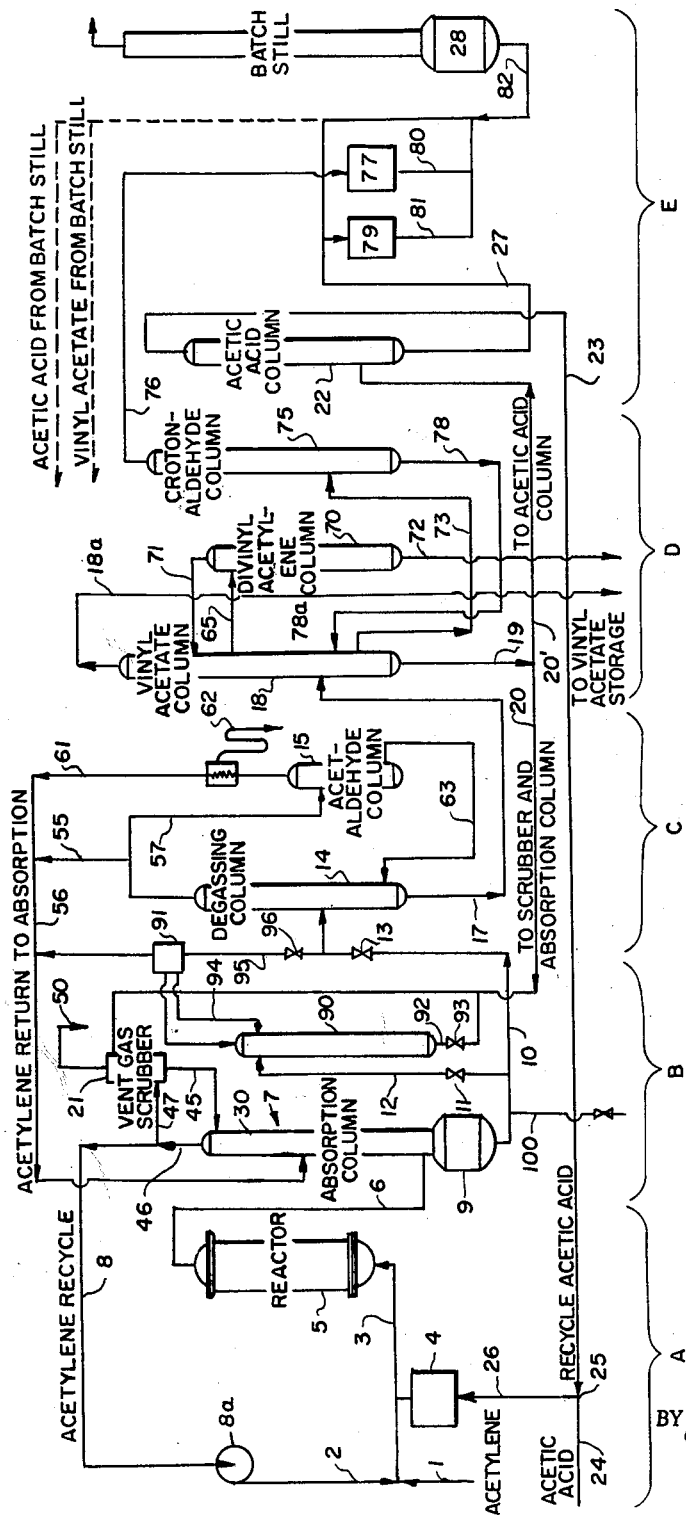

March 9, 1965 G. B. KARNOFSKY 3,172,733
APPARATUS FOR THE MANUFACTURE OF VINYL ACETATE
Filed Nov. 19, 1962 2 Sheets-Sheet 1

Fig. I.

INVENTOR.
GEORGE B. KARNOFSKY
BY Christy, Parmelee
? Strickland
his ATTORNEYS

March 9, 1965

G. B. KARNOFSKY 3,172,733

APPARATUS FOR THE MANUFACTURE OF VINYL ACETATE

Filed Nov. 19, 1962

2 Sheets-Sheet 2

INVENTOR.
GEORGE B. KARNOFSKY
BY
his ATTORNEYS

3,172,733
APPARATUS FOR THE MANUFACTURE OF VINYL ACETATE

George B. Karnofsky, Pittsburgh, Pa., assignor to Blaw-Knox Company, Pittsburgh, Pa., a corporation of Delaware
Filed Nov. 19, 1962, Ser. No. 238,514
7 Claims. (Cl. 23—263)

This invention relates to the manufacture of vinyl acetate monomer and is for an improved method of and apparatus for its manufacture.

Vinyl acetate is commonly produced by reacting acetylene gas with vaporized glacial acetic acid in the presence of a catalyst. The reaction proceeds to a point of equilibrium, leaving unreacted substantial amounts of acetylene and acetic acid. These unreacted compounds leave the reactor along with the vinyl acetate monomer, and, in addition, there are small amounts of side reaction products. United States patent to Stanton, No 2,794,827, granted June 4, 1957, discloses such a procedure and the general aspects of these side reaction products. A commercial operation therefor involves the recovery of the vinyl acetate, the recycle to the reactor of unreacted acetic acid and acetylene, and the removal of these side reaction products. Important in the operation of the process is the venting of uncondensable gases with a minimum loss of acetylene.

It is presently good practice and typical in such processes to condense the crude products leaving the reactor by cooling such products to a temperature as low as 0° F., this low temperature being necessary in order to minimize recycling to the catalyst of product vinyl acetate and by-products in the acetylene stream. Ineffective cooling and condensation of the vinyl acetate and its recycle with acetylene to the reactor would result in the further reaction or decomposition of the vinyl acetate into other unwanted end products, or at least the undesirable dilution of the mixture of acetic acid vapor and acetylene in the reactor.

The reaction between acetic acid and acetylene is exothermic and takes place at a controlled temperature between 340° F. to 420° F., the temperature depending on catalyst age and activity. For each new volume of acetylene fed into the system, roughly eight volumes must be recycled. It is therefore apparent that a commercial plant for cooling the products of the reactor to temperatures well below freezing and at around 0° F. entails substantial expense both in the first cost of the refrigeration plant and in the subsequent power costs for its operation.

In contrast to all other processes where good commercial production involves low temperature condensation of the crude product from the reactor, the present invention provides a method of and apparatus for producing vinyl acetate monomer wherein the products from the reactor are condensed in an absorption column utilizing acetic acid as the absorbent, and preferably acetic acid derived from the recycling of acetic acid which has left the reactor. The minimum refrigerant temperature required in this process is about 40° F. as compared with temperatures in the neighborhood of zero degrees. This reduces both the capital investment for low temperature refrigeration facilities and the high power cost of operating them.

The invention further provides for the scrubbing of the vent gases with the acetic acid being recycled to the absorption column by first flowing the recycled acetic acid through a scrubber and then into the absorption column. A side stream from the gas being recycled to the reactor contacts the acetic acid in the scrubber and the acetylene component of the side stream is absorbed while uncondensed gases are vented from the scrubber and removed from the system with negligible loss of acetylene.

The invention has for a principal object to provide an improved method of an apparatus for the manufacture of vinyl acetate monomer from acetylene and acetic acid.

The invention has for a further object to provide a method and apparatus for the manufacture of vinyl acetate requiring a lower capital investment and lower operating cost than existing commercial processes, and to provide a method for recovering reaction products by absorption, rather than by low temperature condensation.

The invention has for a further object to provide for venting non-condensable reaction gases from the reactor in an effective and economical manner.

Figure 2:
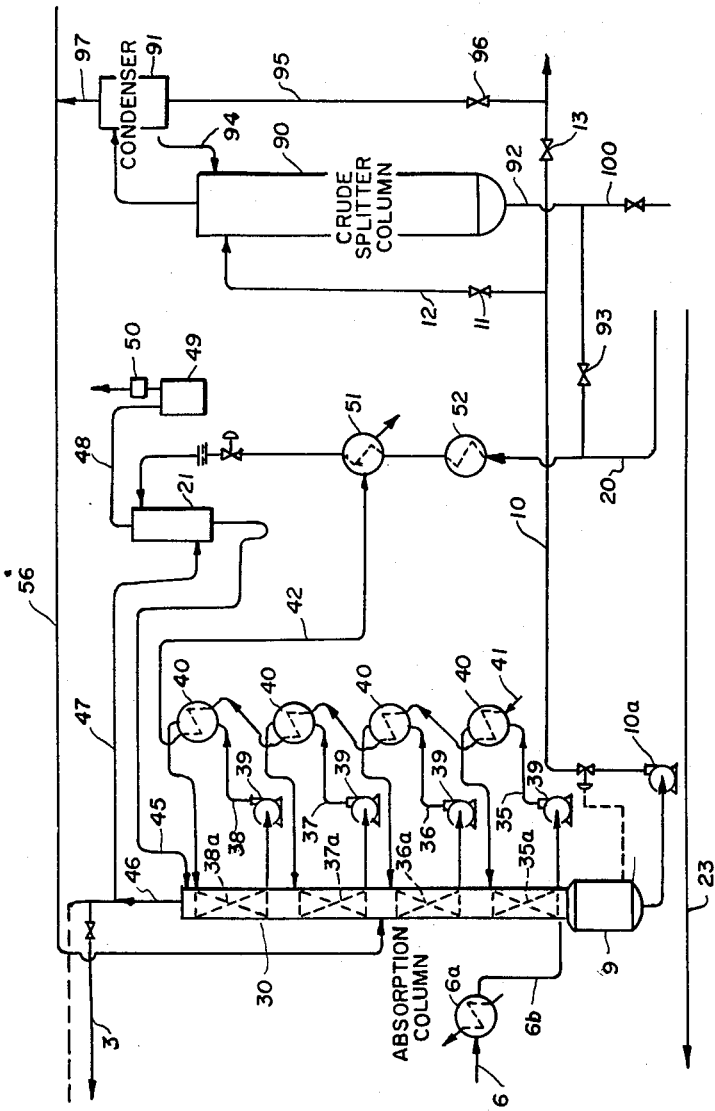

These and other objects and advantages are secured by my invention as will hereinafter more fully appear from the following detailed description in conjunction with the accompanying drawings in which:

FIG. 1 is a simplified block diagram showing schematically an apparatus for the practice of the method and constructed according to this invention; and FIG. 2 is a flow diagram of the absorber section of the system.

It may be pointed out that the chemistry of the process of producing vinyl acetate monomer by reacting acetylene and acetic acid over a catalyst such, for example, as zinc acetate on the surface of coke or similar bodies, is well known in the art and constitutes no part per se of the present invention. The present invention pertains to the physical treatment of the products from the reactor to recover therefrom the vinyl acetate and reuse unreacted acetic acid and acetylene and vent from the reactor system uncondensable vapors, while preventing the recirculation into the reactor of undesirable side reaction products. It may be explained that in the following description the terms "overhead products" and "bottoms," or "bottom products" follow commercial parlance, reference to "overhead" meaning products derived from the top of a distillation column and "bottoms" having reference to product derived from the lower end of the distillation column. Also, the reactor and several distillation columns are of known construction so that the drawings are schematic.

In FIG. 1 which shows the general organization of the apparatus, the different sections have been indicated by brackets. The portion of the system embodying the reaction section is designated A. The portion of the apparatus designated generally as B includes the absorber portion of the system where the crude products of the reactor are contacted with recycled still bottoms comprised mainly of acetic acid. The portion designated C is a degassing and distillation portion of the system up to the still for the separation of vinyl acetate and acetic acid, and the section marked D indicates the portion of the apparatus where vinyl acetate and acetic acid are separated by distillation. The next and last part E includes the portion of the system in which acetic acid not recycled to the absorber is rectified for reuse in the reaction and batch still apparatus for the final recovery of residual acetic acid and acetylene from certain end products before they are discharged from the system.

Referring to FIG. 1 in greater detail, acetylene is supplied through pipe 2 to the reactor feed pipe 3. Glacial acetic acid, after being heated and vaporized in vessel 4 is also introduced into the reactor feed pipe 3 and enters the reactor 5. The products of the reactor system designated "crude reaction products" are conducted through pipe 6 into the lower end of the absorption column designated generally as 7. Here these products move countercurrently toward the top of the absorber against a downflow of absorbent, the absorbent comprising acetic acid from which vinyl acetate has been stripped. The reaction products are here absorbed by this acetic acid. Unabsorbed acetylene withdrawn from the absorption section is carried back from the top of the absorption column through pipe 8 back to the pipe 2 to be recycled through the reactor. The absorbent, after leaving the absorber, flows into a collector 9 and into pipe 10 carrying with it absorbed products.

From pipe 10 it may follow either one of two courses here illustrated. According to the first, valve 11 in branch pipe 12 is closed and valve 13 is open, so that the absorbent passes directly into the succeeding section C of the apparatus. The degassing column is designated 14 and the acetaldehyde column is 15. The flow of absorbent is from the bottom of column 14 through pipe 17 to section D where vinyl acetate is removed as overhead from vinyl acetate column 18. The bottoms are withdrawn through pipe 19.

These bottoms, consisting mainly of acetic acid stripped of vinyl acetate and some side reaction products flow in part through pipe 20 into a vent gas scrubber 21 located above the absorber in section B, as hereinafter more fully described. From the scrubber they flow into the top of absorber as also later explained. The remainder of the bottoms from the vinyl acetate column flow through pipe 20' to the acetic acid column 22 in section E. From the top of this column fully rectified acetic acid is removed to be returned through pipe 23 which connects with pipe 24 at 25. New glacial acetic acid is supplied through pipe 24 to mix with the rectified acetic acid from column 22. The acetic acid from these two sources is supplied to the vaporizing vessel 4 through pipe 26.

According to this arrangement only that portion of the unreacted acetic acid which is to be recycled to the reactor is fully rectified, while the portion which is recycled to the scrubber and absorber to be again used as the absorptive medium is incompletely rectified. This is an important advantage in that it reduces the capacity and operating cost of the apparatus for rectifying the acid and the removal of unwanted or harmful side reaction products.

The distillation system further includes columns arranged to remove crotonaldehyde and compounds intermediate in volatility between vinyl acetate and crotonaldehyde, which may include divinyl acetylene if present. The vinyl acetate monomer is transferred to storage. The bottoms from the acetic acid still are carried over through pipe 27 to a batch still 28.

From the foregoing the general arrangement of the apparatus becomes apparent. As will hereinafter more fully appear, unreacted acetylene will be recycled to the absorber from the tops of distillation columns where it is released from the absorbent. More detailed description follows.

The reactor 5 is filled with a catalyst of a type well known in the art. Through the action of the catalyst, acetylene and acetic acid vapor combine until a condition of equilibrium is established. The acetic acid and acetylene react to form vinyl acetate as the principal compound, along with small amounts of the side reaction products above referred to, with a substantial remainder of unreacted acetic acid and acetylene. All of the products of the reactor, including the unreacted components, are withdrawn from the top of the reactor through pipe 6, shown connected to the bottom of the absorption column 7. It is to be understood that conventional filters, heat exchangers, etc., not shown in the drawings, may be provided in the flow of crude products between the reactor 5 and absorption column 7 as may be desired.

The reactor is maintained at an elevated temperature by any suitable means, not shown, according to conventional practice.

Referring now to FIG. 2, the products from the reactor flowing through pipe 6 pass through a heat exchanger 6a where they are cooled and then flow through pipe 6b into the lower portion of an absorber column. The absorber, designated generally as 7 in FIG. 1, comprises a suitably packed column 30 where the products from the reactor may rise countercurrent to a downflowing stream of absorbent which, as above explained, is principally acetic acid. The countercurrent liquid-gas contact column is generally well known, and the interior construction of it forms no part of the present invention. It is important, however, that temperature conditions in the absorber be properly controlled for the reason that glacial acetic acid freezes or solidifies at 62° F. Fortunately, however, its freezing point decreases as it becomes diluted with vinyl acetate which it absorbs as it flows downward through the column. Temperature conditions, therefore, must be kept at a level above the freezing temperature of the acetic acid or the acetic acid-vinyl acetate solution, but below the boiling point of vinyl acetate and some of the lighter side reaction compounds, and should not exceed about 100° F. The absorption of the products of the reactor into absorbent is an exothermic phenomenon, and controlled cooling is therefore necessary to keep the temperature below about 100° F., but above the level where freezing of the absorbent might occur, preferably in the neighborhood of 80° F.

In the heat exchanger 6a the reaction products flowing to the lower portion of the absorber are cooled. As indicated in the diagram in FIG. 2, there is a series of absorption stages in the absorption column disposed vertically one above another, these being designated generally from bottom to top as 35, 36, 37 and 38, respectively. The packed sections inside the absorber are schematically indicated at 35a, 36a, 37a and 38a respectively. The external fluid circulating elements of each absorption stage include a circulating pump 39 and an external heat exchanger 40. Refrigerated water from a source not shown is supplied through pipe 41 to the lowermost heat exchanger 40 and flows in series through the successive heat exchangers upwardly to an outlet pipe 42 from the uppermost external heat exchanger. By this arrangement the lower end of the absorber, where the cooling requirement is greatest because most of the vinyl acetate is absorbed there, is supplied with coolant at the lowest temperature. The temperature gradient of the cooling water through the several heat exchangers 40 at successive levels provides the lowest cooling water temperature where the absorbent is most dilute, and increasingly higher cooling water temperatures toward the top, so that the minimum temperature of the absorbent in each section of the absorber is above the freezing temperature of the acetic acid with the absorbed reaction products.

Acetic acid enters the top of the absorber column 5 through a pipe 45. Acetic acid saturated with absorbed reaction products is collected in the vessel 9 at the bottom of the column. The absorbent with the absorbed crude reaction product is pumped from the vessel 9 through pipe 10 by pump 10A and to the first portion of the distillation section of the apparatus, assuming as before that valve 11 is closed and valve 13 is open.

Unreacted acetylene and other non-condensable gases leave the top of the absorber column through pipe 46 connected to pipe 8. The main body of these gases flows through this pipe, which connects to pipe 2 in advance of blower 8a to be recycled to the reactor. Part of these gases, however, are withdrawn as a side stream from the pipe 46 through pipe 47 into the vent gas scrubber 21 where the side stream gases flow countercurrent to acetic acid absorbent entering through pipe 20. This acetic acid absorbs acetylene from the gases entering the vent gas scrubber, while other gases not absorbed by the acetic acid, and which must be vented from the system, are removed from the top of the scrubber through pipe 48 and seal pot 49 (see FIG. 2) into stack discharge pipe 50. The acetic acid absorbent flows from the bottom of the scrubber 21 into the pipe 45 to the top of the main absorber column 30. The acetic acid supplied to the vent gas scrubber is derived, as hereinbefore indicated and hereinafter more fully described, from the subsequent distillation stages of the system.

Included in the pipe 20 as shown in FIG. 2, but for clarity of illustration not shown in FIG. 1, is a heat exchanger 51, and if desired a preceding heat exchanger 52. In the heat exchanger 51 the absorbent is cooled by spent refrigerant flowing through pipe 42 flowing out of the last heat exchanger 40 for the absorber. In heat exchanger 52 the absorbent flowing to the scrubber is initially cooled.

With proper temperature control in the absorber and an adequate flow of absorbent, all of the reaction products including the vinyl acetate and the heavier side reaction products and acetylene which is absorbed in the scrubber are carried with the absorbent into vessel 9 and pipe 10 as previously described.

Also, as previously pointed out in the operation of the reactor, certain non-condensable gases are introduced with the acetylene or produced which must be vented from any system for the manufacture of vinyl acetate from the reaction of acetylene and glacial acetic acid, because if they were not vented, they would accumulate in the system and be recycled with the acetylene, diluting it, and reducing the efficiency of the reactor. With the present system, the side stream of gas which is lead from the top of the absorption column through the pipe 47 into the scrubber is contacted with acetic acid flowing to the absorber. The acetic acid is thus utilized in the scrubber to recover most of the acetylene in this side stream, while the non-condensable gases escape from the scrubber. The use of acetic acid in the scrubber prior to its use in the absorber is not detrimental, inasmuch as the absorbent must become saturated with acetylene anyway in the top of the absorber if it were not already so saturated, so that there is no disadvantage in it becoming saturated in the scrubber in advance of the top of the absorber. Moreover the acetic acid leaving the heat exchanger 51 and entering the top of the scrubber is cooled to about 70° F., rendering it more effective as an absorber for acetylene in the scrubber, and its temperature level is in the range necessary for use in the absorption column.

It is important to bear in mind that while I have referred to acetic acid being supplied to the scrubber and to the absorber as the absorption medium, this is preferably not fully rectified acetic acid, but acetic acid from which vinyl acetate has been stripped but otherwise incompletely rectified.

In the Stanton patent above referred to, it is stated that it is the usual practice to introduce the make-up or new acetic acid to the system through the scrubber, and from the scrubber it eventually reaches the reactor.

The present invention departs from the usual practice there described in that the make-up acid is supplied directly to the reactor and acetic acid bottoms from an intermediate stage of rectification is used in the scrubber. Furthermore, the acetic acid bottoms supplied to the scrubber according to this invention are used as the absorption medium in which the products of the reactor are entrained and subsequently separated. Dissolved in the product from the absorption column are various compounds, including acetylene, acetaldehyde, vinyl acetate, crotonaldehyde and ethylene diacetate.

The degassing column 14 in section C to which the absorbent from vessel 9 is first pumped is a conventional distillation column with a condenser (not shown) at the top. Acetylene gas with traces of light end gases are carried from the top of this unit through pipe 55 and pipe 56 back to the absorption column, being preferably introduced into that column intermediate the top and bottom. Liquid overhead condensed at the top of the degassing column is delivered through pipe 57 to the acetaldehyde column 15, entering this column between its top and bottom. This is a conventional distillation column having a condenser (not shown). Acetylene given off at the top of this column is carried by pipe 61 to the pipe 56 for return to the absorption column while the liquid cut comprising largely acetaldehyde is carried off through pipe 62. Bottoms from column 15 are returned through pipe 63 to the lower portion of the degassing column 14.

In the section indicated as D in FIG. 1 the bottoms from the degassing column carried through the pipe 17 enter a distillation column 18 which is designated the "vinyl acetate" column. The product from the pipe 17 enters the column 18 intermediate its top and bottom. The top of the column may conveniently include a conventional refluxing system (not shown) as commonly used in such equipment. Vinyl acetate, which is the overhead product, is condensed by conventional means (not shown) and removed through pipe 18a to storage, while the bottoms from column 18 are removed through pipe 19 where a portion thereof is passed by pipe 20 back to the vent gas scrubber and the absorber as previously described. Since the bottoms withdrawn will exceed by the amount of unreacted acetic acid the amount required to be recirculated to the absorber, the remainder are directed to the right as shown in FIG. 1 through pipe 20' as above explained to the acetic acid rectification column.

A side stream is taken off the column 18 at a predetermined level below the top through pipe 65 to the upper portion of a distillation column 70 for the removal of compounds intermediate in volatility between vinyl acetate and crotonaldehyde, such as, for example, dinvinyl acetylene if present, for which reason column 70 has been called "divinyl acetylene column" in FIG. 1. The overhead from the column 70 is cycled from the top of this column through pipe 71 back to the vinyl acetate column 18 at a level above the side stream off-take at 65. Divinyl acetylene is removed from the bottom of column 18 through pipe 72 to a point of disposal.

A second pipe 73 at a proper level above the bottom of column 18 removes a side stream from below the mid point of this column, and this side stream is led from the column 18 to a point near the bottom of another column 75 designated the "crotonaldehyde" column, which is also a conventional distillation tower provided with refluxing means and overhead product condensing means in the usual manner (not shown). Overhead product is removed from this column through pipe 76 leading to a crotonaldehyde fraction storage tank 77. Bottoms withdrawn from the column 75 through pipe 78 return to the vinyl acetate column 18 at a level above the pipe 73, the point of return of pipe 78 to column 18 being designated 78a.

The acetic acid rectifying column 22 to which part of the bottoms of the vinyl acetate column flow through pipe 20' is also a conventional distillation column with the usual refluxing and condensing system (not shown) at the top, and reboiler at the bottom. As previously explained, the overhead from this column is rectified acetic acid that is returned to the reactor through pipe 23. The bottoms from the column 22 are comprised largely of ethylidene diacetate and acetic anhydride and these are carried by pipe 27 to a storage tank 79 enroute to the batch still 28.

The overhead from the crotonaldehyde column collected in storage vessel 77 and the bottoms in vessel 78 are produced in relatively small amounts but they contain some residuum of acetic acid and vinyl acetate. The batch still 28 is for the distillation of these relatively small quantities of material collected in vessels 77 and 79 and separating out a substantial portion of these residues of acetic acid and vinyl acetate. Condensate is transferred from vessels 77 and 79 through pipes 80 and 81 respectively to pipe 82 for transfer to the batch still 28, which is also of conventional construction. It may be desirable to collect the acetic acid and vinyl acetate from the batch still separately from the main stream to avoid any likelihood of crotonaldehyde or other side reaction products getting back into the reactor or into the vinyl acetate.

In the foregoing description one method of using the apparatus is described without reference to that column designated "crude splitter" and indicated by the numeral 90, and as above described, this column could be eliminated. However, the preferred arrangement and method includes this column. It, like the other columns, is of conventional construction and has refluxing means including a condenser, indicated at 91 at the top.

Utilizing the absorber feed column, valve 11 in branch pipe 12 is open and valve 13 in pipe 10 is closed so that the absorbent from the absorption column and vessel 9 flows up branch pipe 12 into the upper portion of the crude splitter. Bottoms from this column flow through pipe 92 and valve 93 (which is open, but which was closed during the procedure first described) into pipe 20 to the scrubber 21. Part of the bottoms removed to the pipe 20 flow in the reverse direction to pipe 20' and directly into the acetic acid column.

Products from the top of column 90 enter the condenser and reflux means 91, some of the condensate being refluxed to the column through pipe 94 and some of the overhead condensate is carried through pipe 95 and valve 96 (which is now open, but which is closed when using the apparatus according to the first method) into pipe 10 to there continue through the system as first described. Acetylene which is released from the absorbent in this column is carried through pipe 97 to pipe 56 back to the absorption column.

The overhead product carried over through pipe 95 comprises principally vinyl acetate and acetic acid, along with lesser amounts of acetylaldehyde, crotonaldehyde and lighter end products. The bottoms which are recycled to the scrubber comprise principally acetic acid with acetic anhydride and ethylidene diacetate. These two compounds are low melting compounds, so they reduce the freezing point of the acetic acid and reduce the possibility of the acetic acid freezing in the absorber under some unusual operating condition. This is one reason why this second method, using the crude splitter, is preferable to utilizing the bottoms from the vinyl acetate column to the scrubber. Another important reason for using the second method with the crude splitter is the early removal of ethylidene diacetate from intimate association with the vinyl acetate monomer, which it is likely to subsequently contaminate upon subsequent heating.

Since acetic anhydride and ethylidene diacetate will tend to accumulate in the absorbent in its continuous recycle between absorber and the crude splitter column, provision may be made at 100 for drawing off a small amount of the bottoms in the absorber-feed column circuit. The bottoms so drawn off may be taken by pipes not shown to the acetic acid column or to the batch still for recovery of the acetic acid.

For simplification of the description, the reboilers, circulating pumps, condensers and refluxing means for the several columns, as well as other accessories, all of which are conventional and well known in the art have not been shown, since the invention is embodied by the system and not its individual components.

It is important in any of the systems that the bottoms which are recycled to the absorber be from some point where the acetic acid has been stripped of vinyl acetate, and that the temperature in the absorber itself be low enough to assure absorption of the vinyl acetate into the absorbent without likelihood of the vinyl acetate being carried off with the acetylene and recycled to the reactor where it might be broken down in a second pass to the reactor into undesirable compounds, or would at least be a diluent in the reactor that would reduce the efficiency of the reactor.

From the foregoing description it will be observed that the basic chemistry of the process is that which has heretofore been used. The present invention, however, provides a more economical procedure for processing the crude products from the reactor and recycling unreacted acetylene and acetic acid, without subjecting these products to the low temperature condensation demanded by present-day good commercial practice. The extensive refrigeration equipment and power requirement necessary to cool the products to a temperature of about 10° F. or below are eliminated since the lowest temperature for the coolant for the absorber need be only as low as about 40° F. and water may be used as the refrigerant for the absorber coolers.

The invention utilizes as the absorbent, bottoms from a subsequent distillation stage which are comprised principally of acetic acid in preference to completely refined acetic acid, both because of the economy of utilizing a partially refined acid in place of one that has been fully rectified by distillation, and because the heavier side reaction products depress the freezing point of the acetic acid and thereby reduce the probability of its freezing under any unusual condition. It is important, as above noted, that the absorbent be removed from a point in the distillation system for return to the absorber where it has been stripped of vinyl acetate, or at least most of it. It would, of course, be possible to utilize acetic acid that has been fully rectified as the absorbent, and the present invention includes such use, but there are advantages in using crude bottoms from an earlier distillation column because the possibility of freezing in the absorption column is substantially eliminated and there is a substantial economy with no offsetting disadvantage to using acetic acid which has not been fully rectified. The fully rectified acid, however, should be used for recycle to the reactor.

In brief, the present invention effectively eliminates detrimental amounts of vinyl acetate and traces of crotonaldehyde from the acetylene that is recycled to the reactor more satisfactorily than does conventional low temperature condensation, but without the attendant cost of the low temperature system.

Since it is not possible to avoid the inclusion of some atmospheric gases and non-condensable gases from the reactor discharge, the present invention involving the use of recycled still bottoms in the vent gas scrubber accomplishes the removal of these gases after operation has become stabilized at the same rate that they are formed or fed into the system, thereby preventing the increasing accumulation of these gases as the operation continues.

While I have shown and described in detail certain preferred embodiments of my invention, it will be understood that various changes may be made therein and in the organization and location of various components within the contemplation of this invention and under the scope of the following claims.

I claim:

1. Apparatus for the manufacture of vinyl acetate monomer comprising a catalyst containing reactor, means for introducing acetylene and vaporized acetic acid into the reactor, an absorption column, means for removing crude products from the reactor and introducing them into the lower portion of the absorption column, means for recycling gas from the top of the absorption column to the reactor, means for removing absorbent with absorbed crude reaction products therein from the column, a distillation system to which the absorbent with the absorbed crude products is delivered, said system including a distillation column in which vinyl acetate is stripped from the absorbent as overhead product and the absorbent comprised principally of acetic acid is removed from the bottom, means for returning one part of the absorbent so removed from the bottom of said column to the top of the absorption column as the absorbent, distillation means for removing side reaction products from the remaining part of the absorbent removed as bottom product from said distillation column by further distillation thereof to rectified acetic acid, and means for recycling the rectified acetic acid to the reactor.

2. Apparatus for the manufacture of vinyl acetate monomer as defined in claim 1 wherein there is means for cooling the products of the reactor before they enter the absorption column.

3. Apparatus for the manufacture of vinyl acetate monomer as defined in claim 1 wherein there is means for cooling the products of the reactor before they enter the absorption column, and means for maintaining a controlled temperature gradient in the absorption column.

4. Apparatus for the manufacture of vinyl acetate monomer as defined in claim 1 wherein there is means for cooling the products of the reactor before they enter the absorption column, and means for maintaining a controlled temperature gradient in the absorption column with the temperature at the bottom of the column below the freezing point of rectified glacial acetic acid.

5. Apparatus for the manufacture of vinyl acetate monomer comprising a catalyst containing reactor, means for introducing acetylene and vaporized acetic acid into the reactor, an absorption column, means for removing products from the reactor and introducing them into the lower portion of the absorption column, means for recycling gas from the top of the absorption column to the reactor, means for removing absorbent with absorbed constituents therein from the column, a distillation system to which the absorbent is delivered, said system including a distillation column in which vinyl acetate is stripped from the absorbent as overhead product and the absorbent comprised principally of acetic acid is removed from the bottom, means for returning one part of the absorbent so removed from the bottom of said column to the top of the absorption column as the absorbent, distillation means for removing side reaction products from the remaining part of the absorbent removed as bottom product from said distillation column by further distillation thereof to rectified acetic acid, means for recycling the rectified acetic acid to the reactor, said distillation system including apparatus for removing absorbed gas from the absorbent, and means for returning the absorbed gas so removed to the absorption column below the top of said column and above the level where the products from the reactor enter said column.

6. Apparatus for the manufacture of vinyl acetate monomer as defined in claim 5 wherein means is provided for removing a side stream from the gas being recycled from the absorption column to the reactor, a scrubber into which the side stream so removed is delivered, a vent leading from the scrubber, the scrubber being connected into said means for supplying absorbent from the distillation system to the absorption column whereby the absorbent passes through the scrubber before entering the absorption column.

7. Apparatus for the manufacture of vinyl acetate monomer as defined in claim 1 wherein the distillation system comprises a crude splitter column to which the absorbent from the absorption column first flows, a degassing column into which overhead from the first column flows, a column for the removal of acetaldehyde to which overhead condensate from the degassing column is processed, means for directing bottoms from said first-named column in part to the top of the absorption column and in part to an acetic acid rectification column, a vinyl acetate distillation column, means for removing bottoms from the degassing columns to the vinyl acetate column, means for removing vinyl acetate as overhead from the vinyl acetate column, means for withdrawing bottoms from the vinyl acetate column, a crotonaldehyde column, said means for removing bottoms from the vinyl acetate column terminating in the crotonaldehyde column, and means for returning acetylene from the overhead of the crude splitter column and the degassing column to an intermediate level in the absorption column.

References Cited by the Examiner
UNITED STATES PATENTS

| | | | |
|---|---|---|---|
| 1,595,602 | 4/26 | Heffner | 23—263 |
| 2,373,646 | 4/45 | Binnington | 23—263 |
| 2,521,113 | 9/50 | Braconier | 260—498 |
| 2,794,827 | 6/57 | Stanton | 260—498 |

MORRIS O. WOLK, *Primary Examiner.*

LEON ZITVER, *Examiner.*